United States Patent [19]
Gruttadauria

[11] Patent Number: 5,984,321
[45] Date of Patent: Nov. 16, 1999

[54] UNIVERSAL QUICK JAWS

[76] Inventor: Peter Gruttadauria, 279 Swan Lake Dr., Patchogue, N.Y. 11772

[21] Appl. No.: 09/157,912

[22] Filed: Sep. 21, 1998

[51] Int. Cl.[6] .................................................. B23B 31/16
[52] U.S. Cl. .......................................... 279/123; 279/153
[58] Field of Search .................................. 279/123, 152, 279/153

[56] References Cited

U.S. PATENT DOCUMENTS

| | | | |
|---|---|---|---|
| 2,421,281 | 5/1947 | McKay et al. | 279/123 |
| 3,190,666 | 6/1965 | Testa | 279/123 |
| 4,706,973 | 11/1987 | Covarrubias et al. | 279/153 |
| 5,842,704 | 12/1998 | Gilliam | 279/153 |

*Primary Examiner*—Steven C. Bishop
*Attorney, Agent, or Firm*—Michael I. Kroll

[57] ABSTRACT

The present invention discloses a set of multiple universal adjustable soft jaws 26 for holding workpieces for being mounted onto a lathe chuck body 14 for mounting onto the spindle 15 of a lathe 10. The multiple jaws 26 are mounted onto the face of the chuck body 14 in the standard manner. The jaws 26 are further equipped on their inner end with an offset flange foot 28 for having mounted thereon custom sized jaw pads 30 which are attached to the offset flange foot 28 with quick connect/disconnect screws 32 which allow the custom sized jaw pads 30 to be quickly and easily removed from the universal set of jaws 26. These custom sized jaws 30 are useful for accommodating workpieces of particular sizes and shapes depending on the specific job application.

1 Claim, 9 Drawing Sheets

UNIVERSAL QUICK JAWS

An expanding collet for machine tools including a tubular body portion having a longitudinal axis and a plurality of slots dividing the tubular body portion into a hub portion and a plurality of fingers extending from the hub portion and having inner and outer surfaces, an adapter member mounted on the outer surface of the free end of each of the fingers, each of the adapter members having an inner surface coincident with the outer surface of the fingers, the adapter members each including a portion beyond the free end of the fingers and extending radially inward toward the longitudinal axis, the adapter members each including an outer surface longer than its respective inner surface.

In an arrangement for coupling a false jaw to a master jaw of a chuck, wherein a positive locking is effected by a radial displacement, the master jaw is provided with an extension having a stop surface and a projection. The false jaw has a recess for receiving the extension and a relief shoulder and is guided in the direction of rotation. Due to this arrangement, the false jaw is well supported and highly stable, so that strong forces can be transmitted, and a highly repetitive accuracy in chucking is obtained.

The soft jaws of a lathe chuck or the like are constructed to be engaged by studs of an adjustable lock ring device for holding the jaws during the machining thereof to fit a workpiece to be held by the jaws.

A universal sleeve-clamp for using interchangeable jaw pieces to clamp a workpiece has a sleeve with a plurality of radially moveable elements. Features are provided for locating and attaching the jaw pieces to the radially moveable elements so that, when a clamping taper is made to bear against the radially moveable elements, the radially moveable elements, and hence the interchangeable jaw pieces, are moved radially to clamp the workpiece. The clamping taper may be externally tapered to form an expanding mandrel, or internally tapered to form a collet chuck. The jaw pieces, which are made of soft metal or other easily machinable material, may be shaped for clamping multiple diameters, clamping thin-walled workpieces or for clamping a workpiece eccentrically. A locator plate is used to give additional support to a workpiece, or to align it in a known rotational position for static fixturing.

While these holding devices may be suitable for the purposes for which they were designed, they would not be as suitable for the purposes of the present invention, as hereinafter described.

SUMMARY OF THE INVENTION

The present invention discloses a set of three universal adjustable soft jaws for holding workpieces for being mounted onto a chuck body for mounting onto the spindle of a lathe. The three jaws are mounted onto the face of the chuck body using standard screws. The three jaws are further equipped on their inner end with an offset flange foot for having mounted thereon a custom sized jaw pad which is attached to the offset flange foot with quick connect/disconnect screws which allow the custom sized jaw pads to be quickly and easily removed from the universal set of jaws. These custom sized jaws are useful for accomodating workpieces of particular sizes and shapes depending on the specific job application.

A primary object of the present invention is to provide a soft jaw locking device to hold the workpiece.

Another object of the present invention is to provide a universal set of jaws and the jaws are configured to hold custom sized jaw pads.

A still further object of the present invention is to provide a custom sized jaw pad that may quickly be attached to a set of universal jaws.

Yet another object of the present invention is to provide the user with an inexpensive method of holding various sized work pieces.

Additional objects of the present invention will appear as the description proceeds.

The present invention overcomes the shortcomings of the prior art by modifying a standard set of jaws to hold a customized set of jaw pads.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

DESCRIPTION OF THE PREFERRED EMBODIMENT(S)

Figure 1:
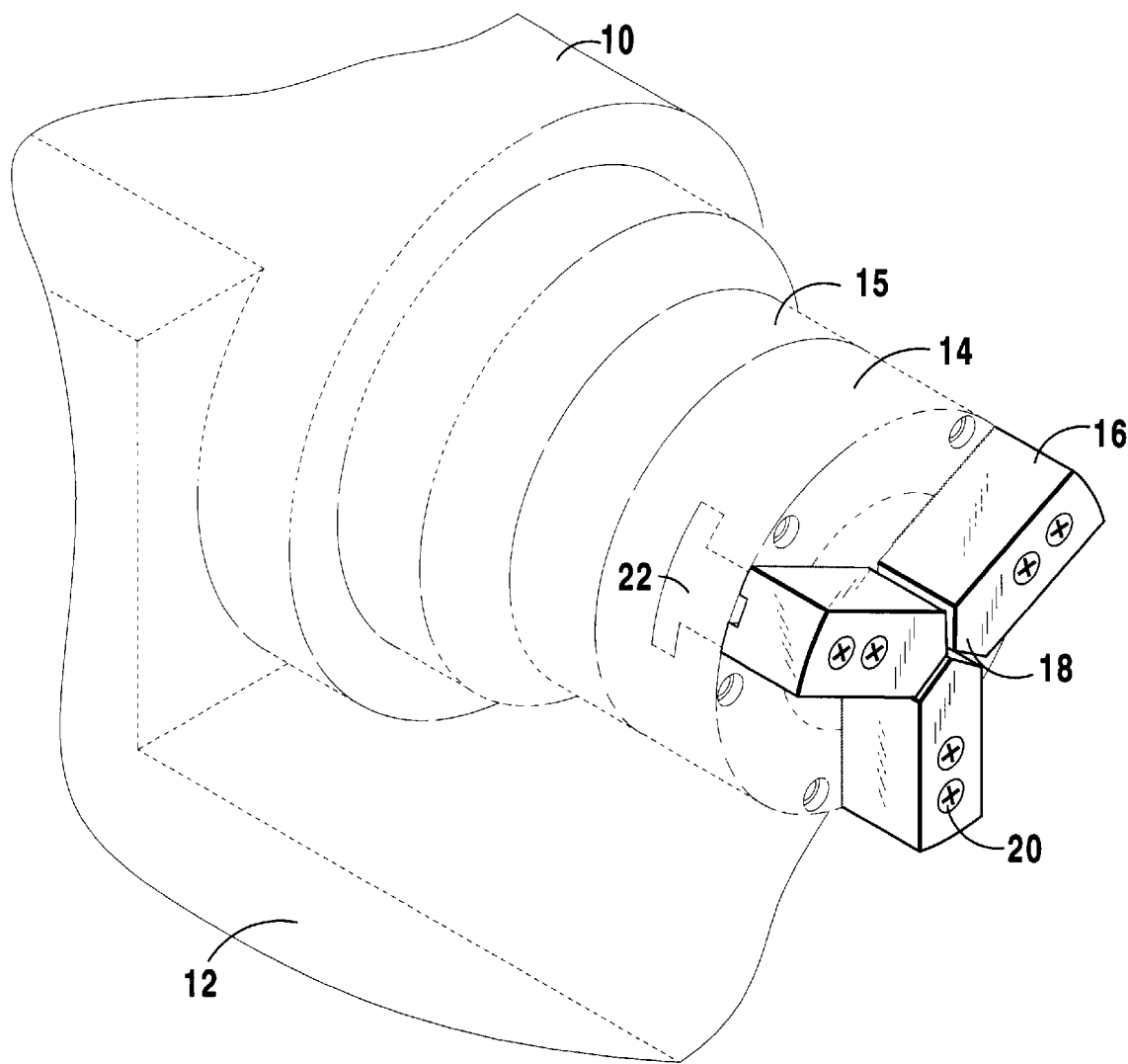
FIG. 1 is a perspective view of a typical lathe with a typical set of adjustable jaws.

Turning now descriptively to the drawings, in which similar reference characters denote similar elements throughout the several views, FIGS. 1 through 5A illustrate the present invention. With regard to the reference numerals used, the following numbering is used throughout the various drawings.

10 lathe
12 bed of lathe
14 body of chuck
15 spindle
16 jaws
18 wedged face
20 head screw
22 master jaw/T-nut
24 concave face
26 universal jaws
28 offset flange foot
29 removed material
30 custom jaw pads
32 quick connect/disconnect screws
34 hole of custom sized jaws
36 recess
38 holes for connecting screws
40 holes for head screws
41 holes for connecting screw
42 groove of jaw
44 serrated face of jaw
46 tongue
48 concave inner face Turning to FIG. 1, therein is shown a perspective view of a or art lathe 10 with its support base or bed 12 whereupon the chuck body 14 is attached in the standard manner to the spindle nose 15 of the lathe 10. Shown therein are the three jaws 16 of the chuck 14 having wedge shaped or pointed inner faces 18 for holding workpieces (not shown). The three jaws 16 are attached to the body 14 by using screws 20 which are typically attached to a T-nut or master jaw 22 which is housed in slotted areas equally circumferentially spaced about the body of the chuck 14. The wedge shaped faces 18 of the jaws 16 are used for grinding workpieces including round or square shaped pieces.

Figure 1A:
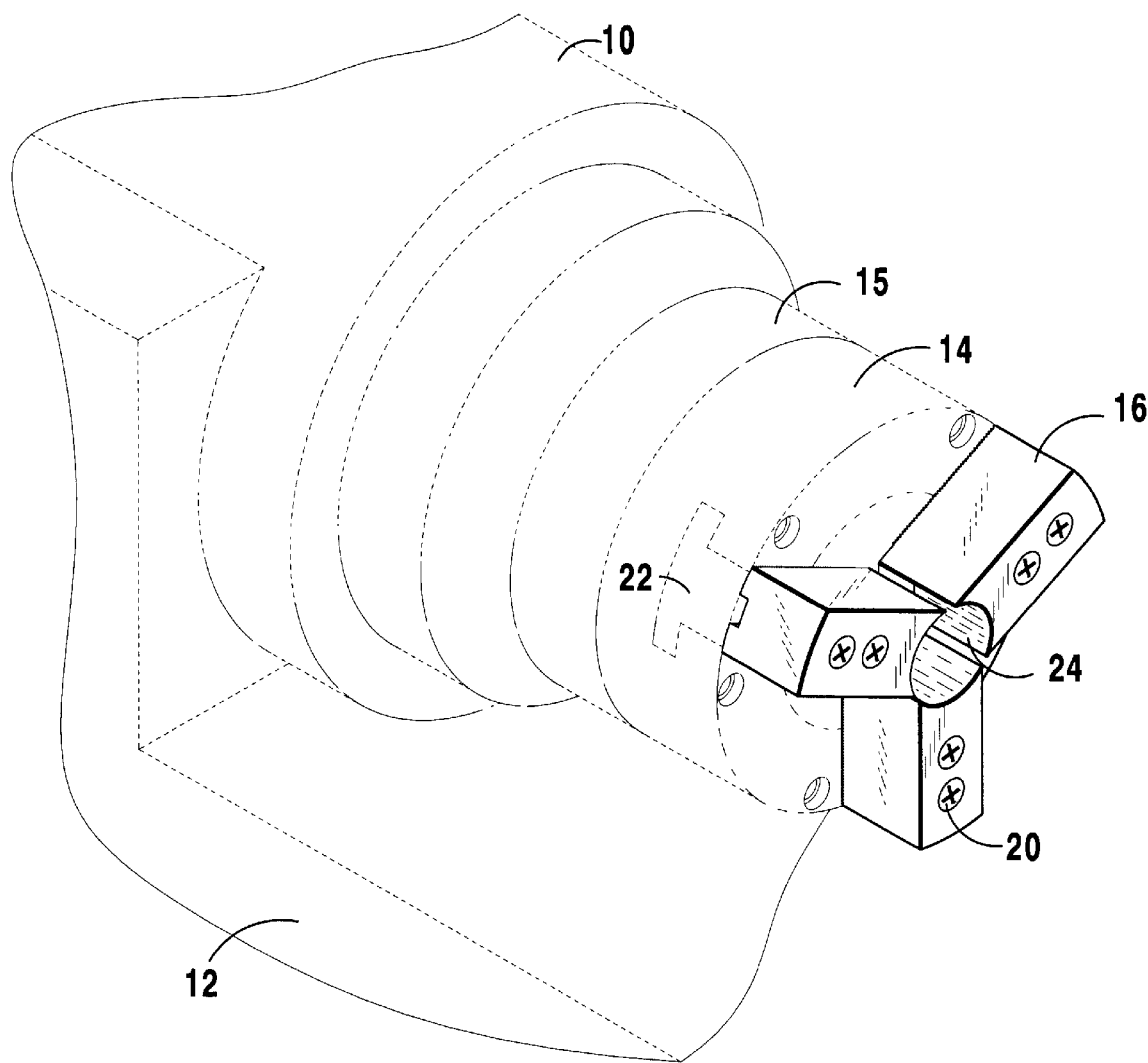
FIG. 1A is a perspective view of a typical lathe with another typical set of adjustable jaws.

Turning to Figure 1A, therein is shown a perspective view of a typical prior art lathe 10 with its support base 12 whereupon the chuck body 14 is attached to the spindle 15 of the lathe 10. Shown therein are the three jaws 16 having concave shaped inner faces 24 for holding mainly round workpieces (not shown). The three jaws 16 are attached to the body 14 by using screws 20 which are attached typically to a T-nut or master jaw 22 which is housed in slotted areas spaced about the body of the chuck 14 and which serve as part of the means for adjusting the jaws in the standard manner.

Figure 2:
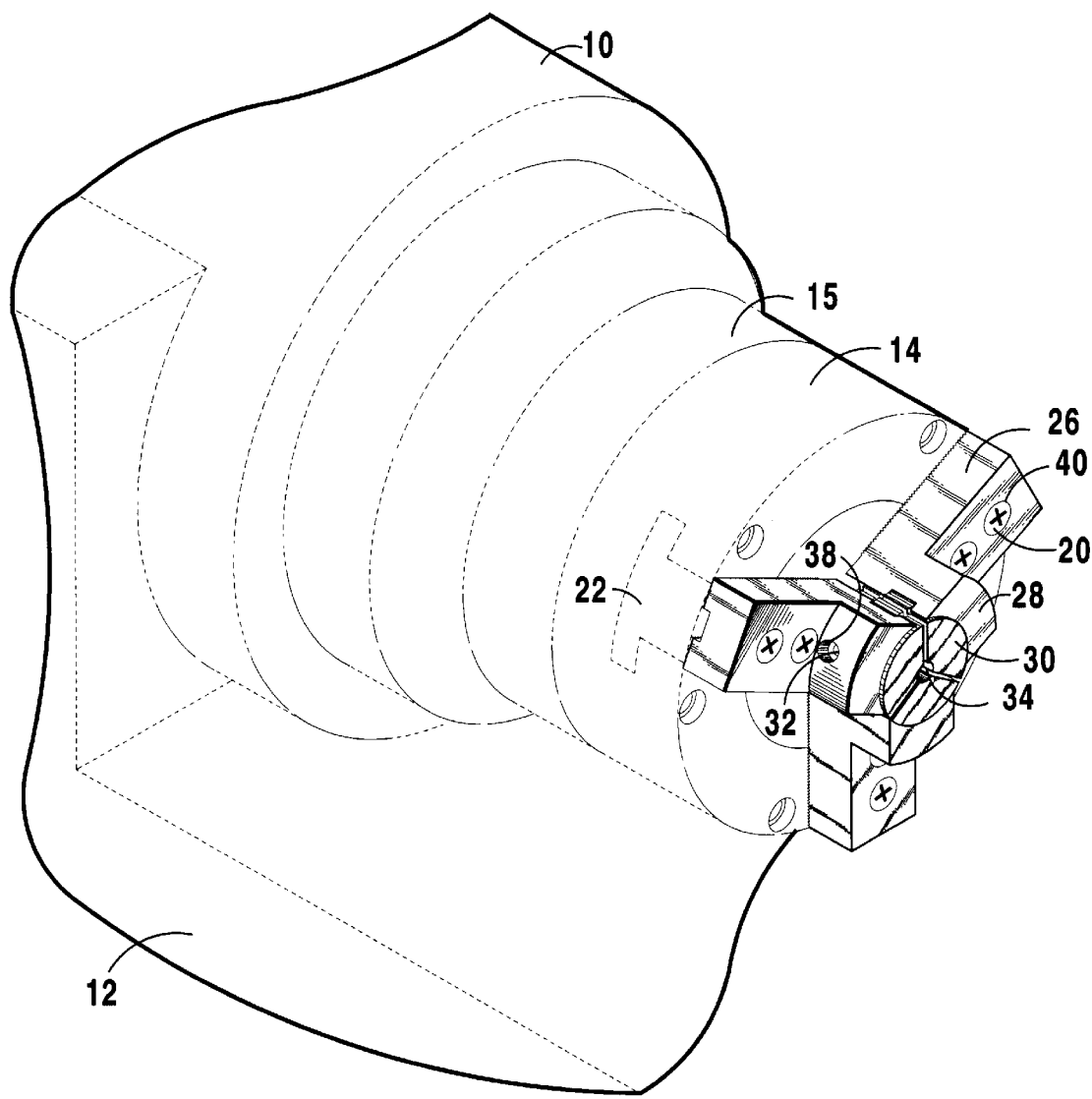
FIG. 2 is a perspective view of the present invention with a set of custom sized jaw pads in place.

Turning to FIG. 2, therein is shown a perspective view of the present invention with a plurality or set of custom sized jaw pads 30 in operative connection. Therein is shown the universal adjustable jaws of the present invention 26, which are attached by means and adjusted inwardly and outwardly about the face of the chuck by means in the standard manner, being attached to the body of the chuck 14 and radially spaced about the chuck face using the screws 20 mounted in recessed holes 40 of the universal jaws 26. Also shown is the offset flange foot 28 located on the inner end of the jaws 26 and the custom jaw pads 30 attached thereto along with the quick connect/disconnect screws 32 for the custom jaw pads 30 which screws 32 are mounted in recessed holes 38 on the offset flange foot 28 of the universal jaws 26. In operation it can be seen that the universal adjustable jaws of the present invention 26 attach to the chuck body 14 and are adjustable similarly to the prior art. However, the first set of universal jaws 26 of the present invention are adapted to have an offset flange foot or base 28 for mounting thereon a second set of the custom sized jaw pads 30 by using the screws 32. The custom sized jaw pads 30 act as an inner piece of the first set of jaws 26 and serve to extend the first set of jaws 26 inwardly. The offset foot 28 extends transversely from one side of the first set of jaws 26 away from and perpendicular to the chuck body 14 and has a concave face on its inner end for receiving the second set of jaws 30. Finally shown therein is the inner space or hole 34 wherein the workpiece (not shown) is held by the custom sized jaws 26. The custom sized jaws 30 are useful for accommodating workpieces of particular sizes or shapes as may be necessary or convenient depending on the specific job purpose or objective and may be a plurality of three, four, or other number as may be desired according to the standard practice of the art.

Figure 2A:
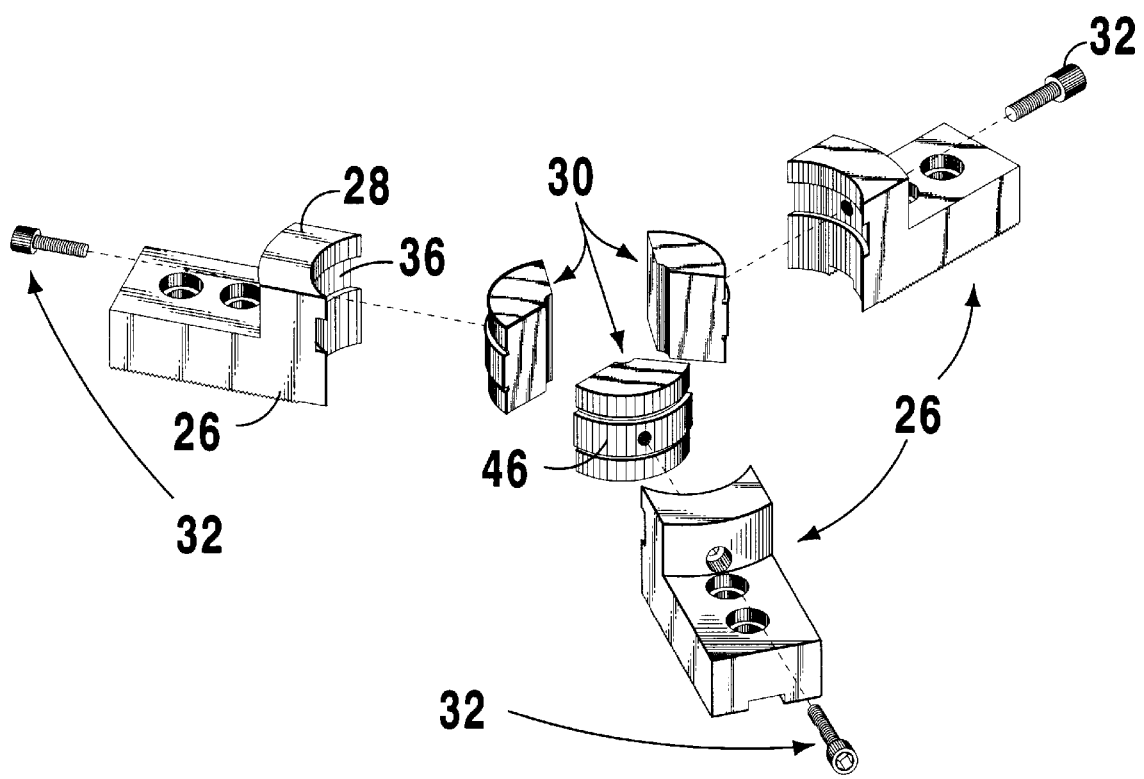
FIG. 2A is a broken out perspective view of the individual components of the present invention.

Turning to FIG. 2A, therein is shown the jaws of the present invention 26, the offset flange foot 28 of the inner face and the custom sized jaws 30 along with the quick connect/disconnect screws 32 for holding the custom sized jaws 30 onto the body of the universal adjustable jaws 26. A circumferential tongue 46 is located on the outer periphery of the custom sized jaws 30 for being received by a recess 36 located on the inner face of the flange foot 36.

Figure 3:
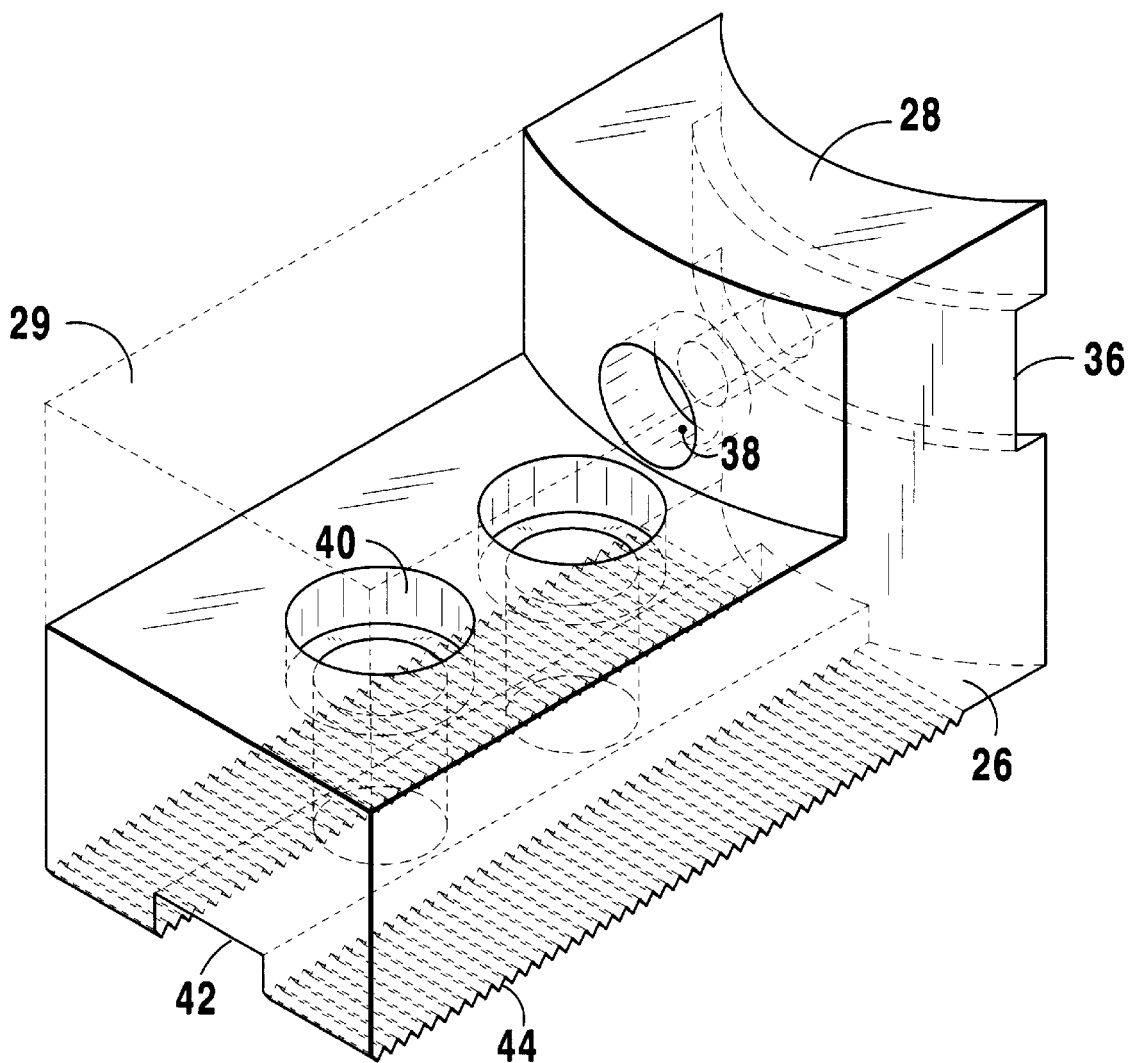
FIG. 3 is a perspective view of one of the universal adjustable jaws of the instant invention and may be fabricated by taking the prior art jaws and removing material so that the rectangular shape of the prior art jaws becomes "L" shaped.

Turning to FIG. 3, therein is shown a perspective view of the universal adjustable jaws 26 of the present invention which may be fabricated by taking the prior art jaws and removing material 29 (shown in outline) from them so that the rectangular shape of the prior art jaws becomes "L" shaped which comprises the offset flange foot or base 28 of the inner face of the present invention 26. Also shown therein is the recessed area 36 on the inner face of the offset flange foot 28 and the recessed hole or aperture 38 for holding the connecting screw (not shown). Also shown therein are the recessed holes 40 for the head screws (not shown) along with the longitudinal groove 42 on the back of the present invention for mating with the master jaw or T-nut (not shown) along with serrations 44 which allow for adjustability on the chuck body and assist in holding the present invention to the face of the chuck body (not shown).

Figure 3A:
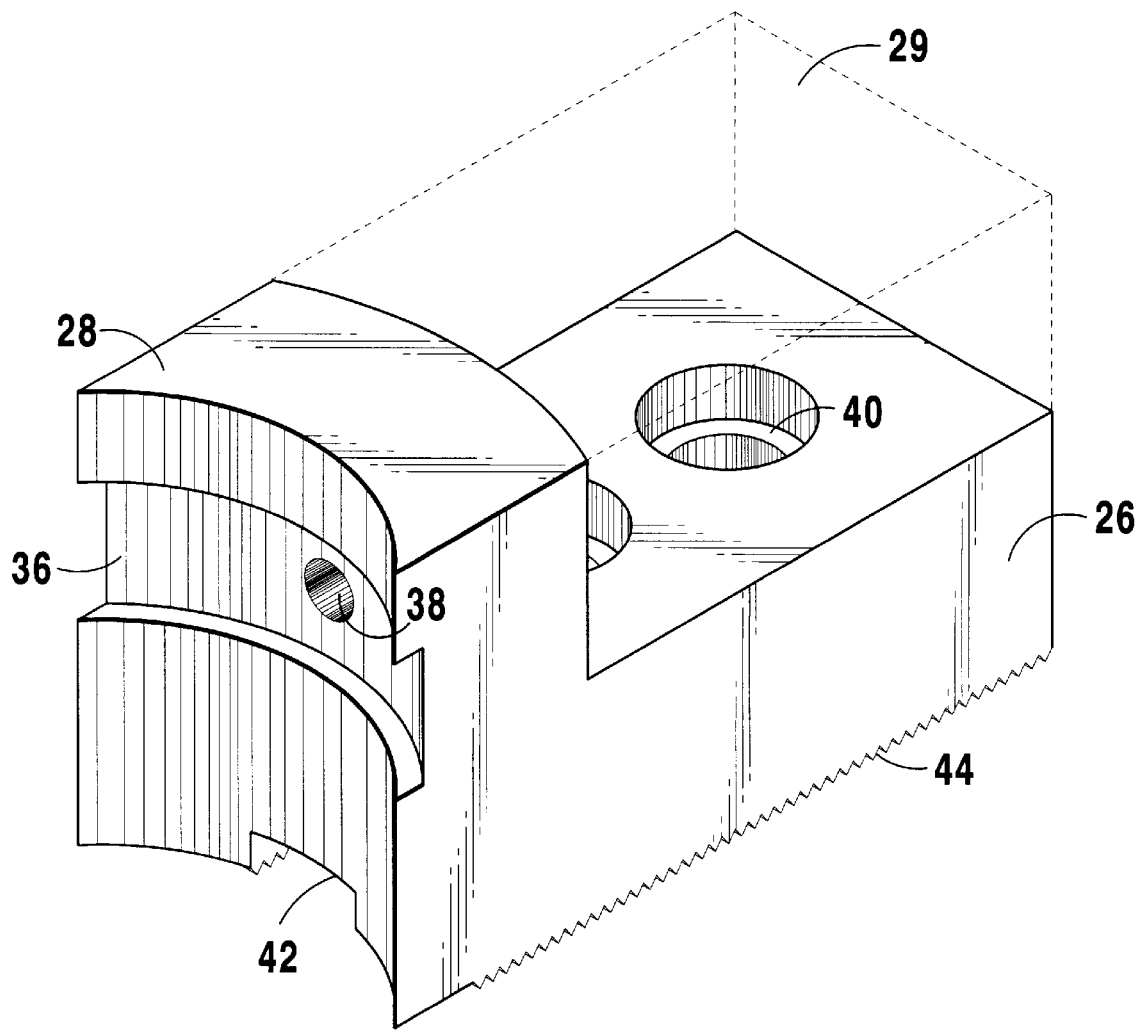
FIG. 3A is a perspective view of another one of the universal jaws of the instant invention and may be fabricated by taking the prior art jaws and removing material so that the rectangular shape of the prior art jaws become "L" shaped.

Turning to FIG. 3A, therein is shown a perspective view of the universal adjustable jaws 26 of the present invention which may be fabricated by taking the prior art jaws and removing material 29 (shown in outline) from them so that the rectangular shape of the prior art jaws becomes "L" shaped which comprises the offset flange foot or base 28 of the inner face of the present invention 26. Also shown therein is the recessed area 36 on the inner face of the offset flange foot 28 and the recessed hole or aperture 38 for accommodating or holding the connecting screw (not shown). Also shown therein are the recessed holes 40 for the head screws (not shown) along with the longitudinal groove 42 on the back of the present invention for mating with the master jaw or T-nut (not shown) along with serrations 44 which allow for adjustability on the chuck body and assist in holding the present invention to the face of the chuck body (not shown).

Figure 4:
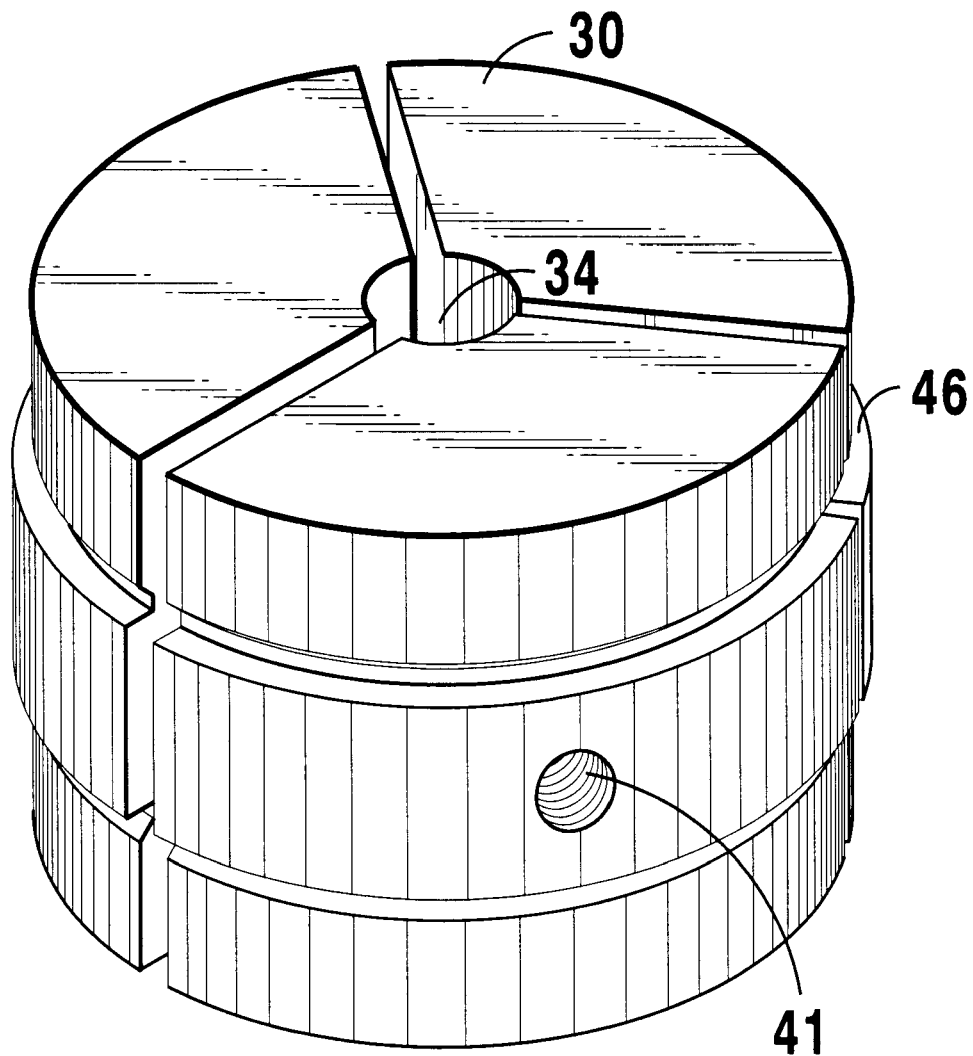
FIG. 4 is a perspective view of the custom sized jaw pads.

Turning to FIG. 4, therein is shown a perspective view of the three custom sized jaw pads 30 of the present invention. Also shown is the threaded hole 41 which extends into the jaw pads 30 on a line perpendicular to the central axis of the chuck body 14 (not shown) which hole 41 is for accepting the connecting screws (not shown). Also shown is the inner hole 34 of the custom sized jaws. Also shown is the circumferential tongue area 46 on the periphery of the jaws which secure it in place in and to the recessed area 36 (not shown) of the flange foot 28 (not shown).

Figure 5:
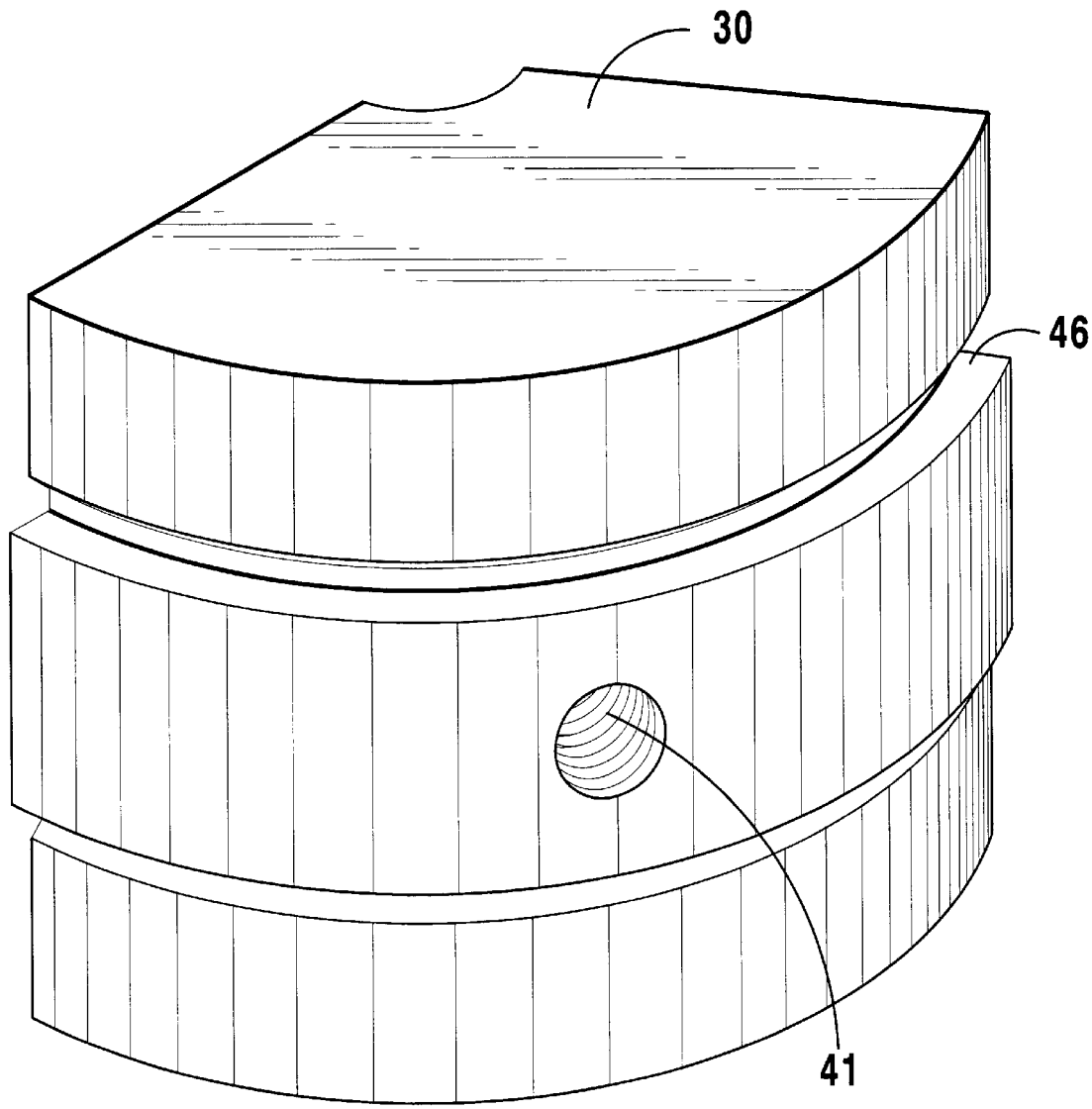
FIG. 5 is a perspective view of one section of the custom sized jaw pads.

Turning to FIG. 5, therein is shown a perspective view of one section of the custom sized jaw pads 30 of the present invention. Shown therein is the hole 41 for accepting the disconnect screw along with the circumferential tongue 46 on the periphery of the pad 30 which mates to the recessed area on the inner face of the offset flange foot 28 (not shown).

Figure 5A:
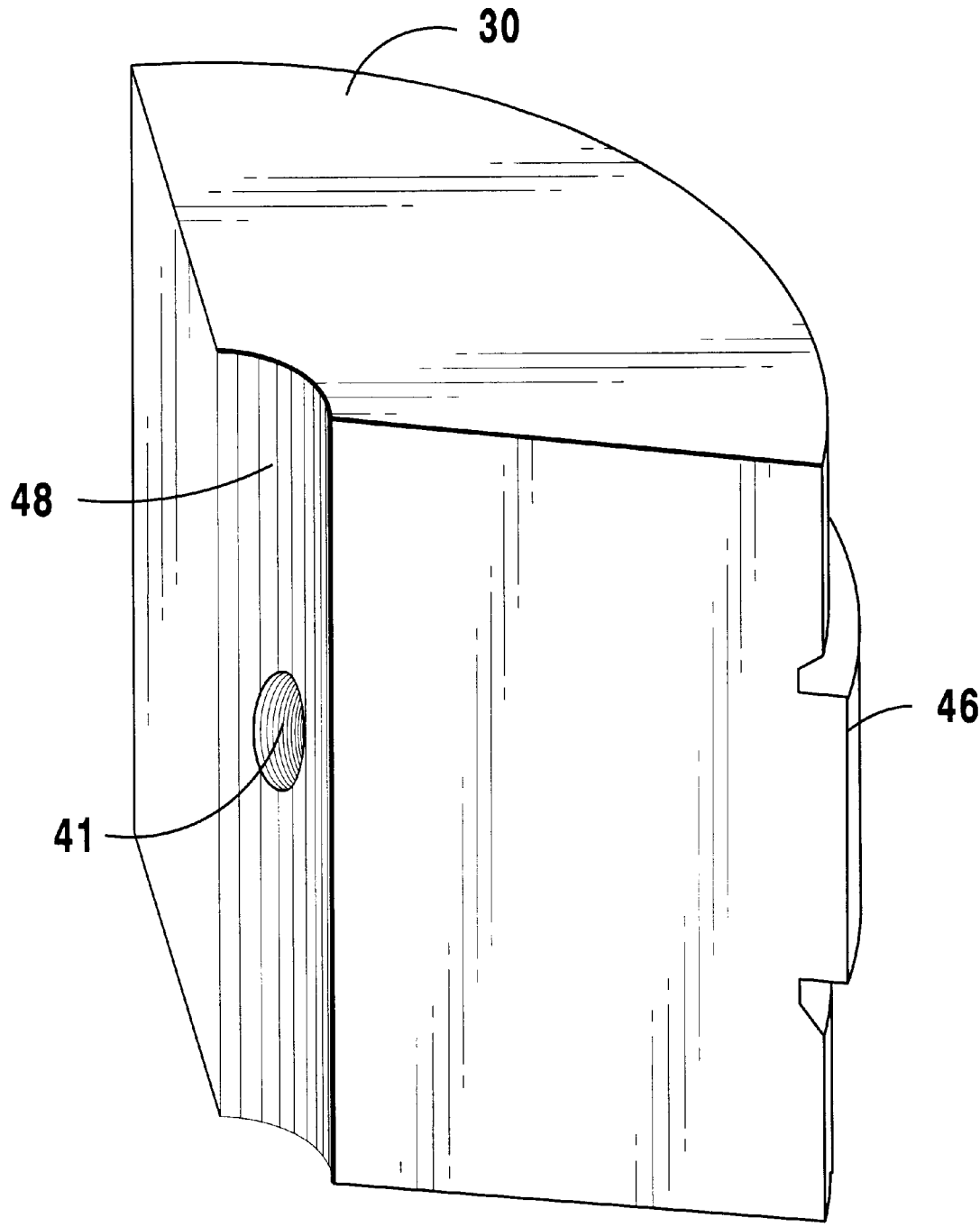
FIG. 5A is a perspective view of another section of the custom sized jaw pads.

Turning to FIG. 5A, therein is shown a perspective view of one section of the custom sized jaw pads 30 of the present invention. Shown therein is the hole 41 for accepting the disconnect screw along with the circumferential tongue 46 on the periphery of the pad 30 which mates to the recessed area on the inner face of the offset flange foot 28 (not shown). Also shown is the concave inner face 48 of the custom sized jaw 30.

What is claimed to be new and desired to be protected by Letters Patent is set forth in the appended claims:

1. Apparatus for holding a workpiece on a lathe chuck having a face comprising:

(a) a plurality of jaws mounted on a flat face of said chuck, each of said jaws being L-shaped with a first leg mounted on said face and a second leg having a concave shaped edge facing said workpiece, the concave edges of the jaws forming a circle being completely smooth and adapted to hold said workpiece for machining;

(b) a recess formed in the concave shaped edge of each jaw extending parallel to the face of said chuck;

(c) a pie-shaped jaw pad nesting against each of said jaws, each jaw pad having an outer circular surface nested in the concave shaped edge of a jaw, said outer circular surface having a circumferential tongue fitted into the recess of a jaw;

(d) a threaded opening extending into the tongue of each of said pads for receiving and engaging a head screw;

(e) a circular opening through the recess of each of said jaws aligned with the threaded opening in the nested pad large enough to accommodate said screw without threading; and (f) a screw for each of said jaws for attaching the nested pad in a quick connect/disconnect manner.

* * * * *